US012726369B2

(12) United States Patent
Gowanlock et al.

(10) Patent No.: US 12,726,369 B2
(45) Date of Patent: Sep. 1, 2026

(54) SALTED HASHING METHOD FOR RESPONSE-BASED CRYPTOGRAPHY

(71) Applicant: Arizona Board of Regents on Behalf of Northern Arizona University, Flagstaff, AZ (US)

(72) Inventors: Michael Gowanlock, Flagstaff, AZ (US); Bertrand F. Cambou, Flagstaff, AZ (US); Kaitlyn Lee, Flagstaff, AZ (US); Christopher R. Philabaum, Flagstaff, AZ (US)

(73) Assignee: Arizona Board of Regents on Behalf of Northern Arizona University, Flgstaff (AZ)

( * ) Notice: Subject to any disclaimer, the term of this patent is extended or adjusted under 35 U.S.C. 154(b) by 122 days.

(21) Appl. No.: 17/871,850

(22) Filed: Jul. 22, 2022

(65) Prior Publication Data

US 2023/0038135 A1 Feb. 9, 2023

Related U.S. Application Data

(60) Provisional application No. 63/225,342, filed on Jul. 23, 2021.

(51) Int. Cl.

*H04L 9/32* (2006.01)
*H04L 9/06* (2006.01)
*H04L 9/08* (2006.01)

(52) U.S. Cl.

CPC .......... *H04L 9/3278* (2013.01); *H04L 9/0643* (2013.01); *H04L 9/0866* (2013.01)

(58) Field of Classification Search

CPC ... H04L 9/3278; H04L 9/0643; H04L 9/0866; H04L 9/06; H04L 9/0861

See application file for complete search history.

(56) References Cited

U.S. PATENT DOCUMENTS 8,958,553 B2 * 2/2015 Tomlinson .............. H04L 9/304 715/746
9,430,406 B2 * 8/2016 Van Der Sluis ...... H04L 9/0869
(Continued)

FOREIGN PATENT DOCUMENTS

EP 3840289 A1 * 6/2021 ........... H04L 9/0643
GB 202015487 * 11/2020 ........... H04L 9/3239
(Continued)

OTHER PUBLICATIONS

Suh, G. E., Devadas, S. "Physical Unclonable Functions for Device Authentication and Secret Key Generation". Jun. 4-8, 2007. IEEE. 2007 44th ACM/IEEE Design Automation Conference. ISBN: 978-1-59593-627-1 (Year: 2007).*
(Continued)

*Primary Examiner* — William S Powers
(74) *Attorney, Agent, or Firm* — Quarles & Brady LLP

(57) ABSTRACT

Systems and methods for cryptographic key generation at a client and server are disclosed. The client has an array of PUF devices, and the server has an image that PUF. The server sends the client addresses of PUF devices to be measured, and retrieves previously stored responses corresponding to those addresses from its database. The client measures responses at the addresses. Each device hashes the resulting responses, and the server compares the hash received from the client to its own. If the hashes to not match, the server searches for a matching hash be perturbing the measured response bit stream until a match is achieved. The perturbed response bitstream, and the measured response at the client are then salted, and used for key generation.

17 Claims, 9 Drawing Sheets

(56) References Cited

U.S. PATENT DOCUMENTS

| | | | | |
|---|---|---|---|---|
| 9,628,272 | B2 * | 4/2017 | Rostami | G09C 1/00 |
| 9,947,391 | B1 * | 4/2018 | Mahatme | G11C 11/419 |
| 11,537,754 | B1 * | 12/2022 | Jameson | G11C 13/0069 |
| 2010/0119057 | A1 * | 5/2010 | Laurent | H04N 21/2383 380/28 |
| 2010/0158242 | A1 * | 6/2010 | Asher | H04L 9/0643 380/28 |
| 2012/0183135 | A1 * | 7/2012 | Paral | G09C 1/00 380/44 |
| 2013/0051552 | A1 * | 2/2013 | Handschuh | H04L 9/0897 380/44 |
| 2013/0094649 | A1 * | 4/2013 | Tomlinson | H04L 9/304 380/30 |
| 2013/0156183 | A1 * | 6/2013 | Komano | H04L 9/0861 380/44 |
| 2015/0188901 | A1 * | 7/2015 | Fielder | H04L 9/0866 726/5 |
| 2015/0195088 | A1 * | 7/2015 | Rostami | H04L 9/3278 380/28 |
| 2016/0156476 | A1 * | 6/2016 | Lee | H04L 9/0866 380/44 |
| 2019/0377554 | A1 * | 12/2019 | Chabrier | H04L 9/004 |
| 2020/0162271 | A1 * | 5/2020 | Cambou | H04L 63/0435 |
| 2020/0412556 | A1 * | 12/2020 | Yoon | H04L 63/0876 |
| 2021/0152349 | A1 * | 5/2021 | Van Der Sluis | H04L 9/08 |
| 2021/0224041 | A1 * | 7/2021 | Tseng | G06F 1/10 |
| 2021/0250188 | A1 * | 8/2021 | Schat | G06F 7/588 |
| 2021/0264014 | A1 * | 8/2021 | Wu | G06F 21/44 |
| 2021/0409233 | A1 * | 12/2021 | Lu | G06F 12/1433 |
| 2023/0216838 | A1 * | 7/2023 | Plusquellic | G06F 21/44 726/7 |
| 2024/0273243 | A1 * | 8/2024 | Lindskog | G06F 21/62 |

FOREIGN PATENT DOCUMENTS

| | | | | |
|---|---|---|---|---|
| WO | WO-2022224022 A1 * | 10/2022 | | H04L 9/0866 |
| WO | WO-2022259013 A1 * | 12/2022 | | G06F 21/30 |

OTHER PUBLICATIONS

B. Cambou et al., “Post Quantum Cryptographic Keys Generated With Physical Unclonable Functions,” Applied Sciences, vol. 11, No. 6, 2021, doi: 10.3390/app11062801.

G. Alagic et al., “Status Report on the Second Round of the NIST Post-Quantum Cryptography Standardization Process,” NIST Interagency/Internal Report (NISTIR), National Institute of Standards and Technology, 2020.

B. Cambou, “Unequally Powered Cryptography With Physical Unclonable Functions For Networks of Internet of Things Terminals,” SpringSim, 2019, pp. 1-13. doi: 10.23919/SpringSim.2019.8732853.

B. Cambou et al., “Ternary Computing to Strengthen Information Assurance,” Cryptography 2018, 2, 6; doi: 10.3390/cryptography201006.

J. P. D’Anvers et al., “Saber: Module-LWR Based Key Exchange, CPA-Secure Encryption and CCA-Secure KEM,” AFRICACRYPT 2018, pp. 282-305.

J. Bos et al., “CRYSTALS—Kyber: A CCA-Secure Module-Lattice-Based KEM,” IEEE European Symposium on Security and Privacy, 2018, pp. 353-367.

A. Hülsing et al., “High-Speed Key Encapsulation From NTRU,” Cryptology ePrint Archive, Report 2017/667, 2017.

G. T. Becker et al., “Security Analysis of Index-Based Syndrome Coding For PUF-Based Key Generation,” IEEE International Symposium on Hardware Oriented Security and Trust (HOST), 2015, pp. 20-25.

J. Delvaux et al., “Helper Data Algorithms For PUF-Based Key Generation: Overview And Analysis,” IEEE Transactions on Computer-Aided Design of Integrated Circuits and Systems, vol. 34, No. 6, pp. 889-902, 2015.

M. Hofer et al., Identification, Authentication and Key Generation Using Physical Unclonable Functions—Overview and Areas of Application, Elektrotechnik & Informationstechnik (2010) 127/4: 72-77. DOI 10.1007/s00502-010-0724-3.

B. Biswas et al., “McEliece Cryptosystem Implementation: Theory and Practice,” PQCrypto, LINCS 5299, pp. 47-62 2008.

R. J. Mceliece, “A Public-Key Cryptosystem Based on Algebraic Coding Theory,” The Deep Space Network Progress Report 42-44, p. 114, 1978.

B. Cambou et al., Response-Based Cryptographic Methods With Ternary Physical Unclonable Functions, Future of Information and Communication Conference, pp. 781-800, 2019.

* cited by examiner

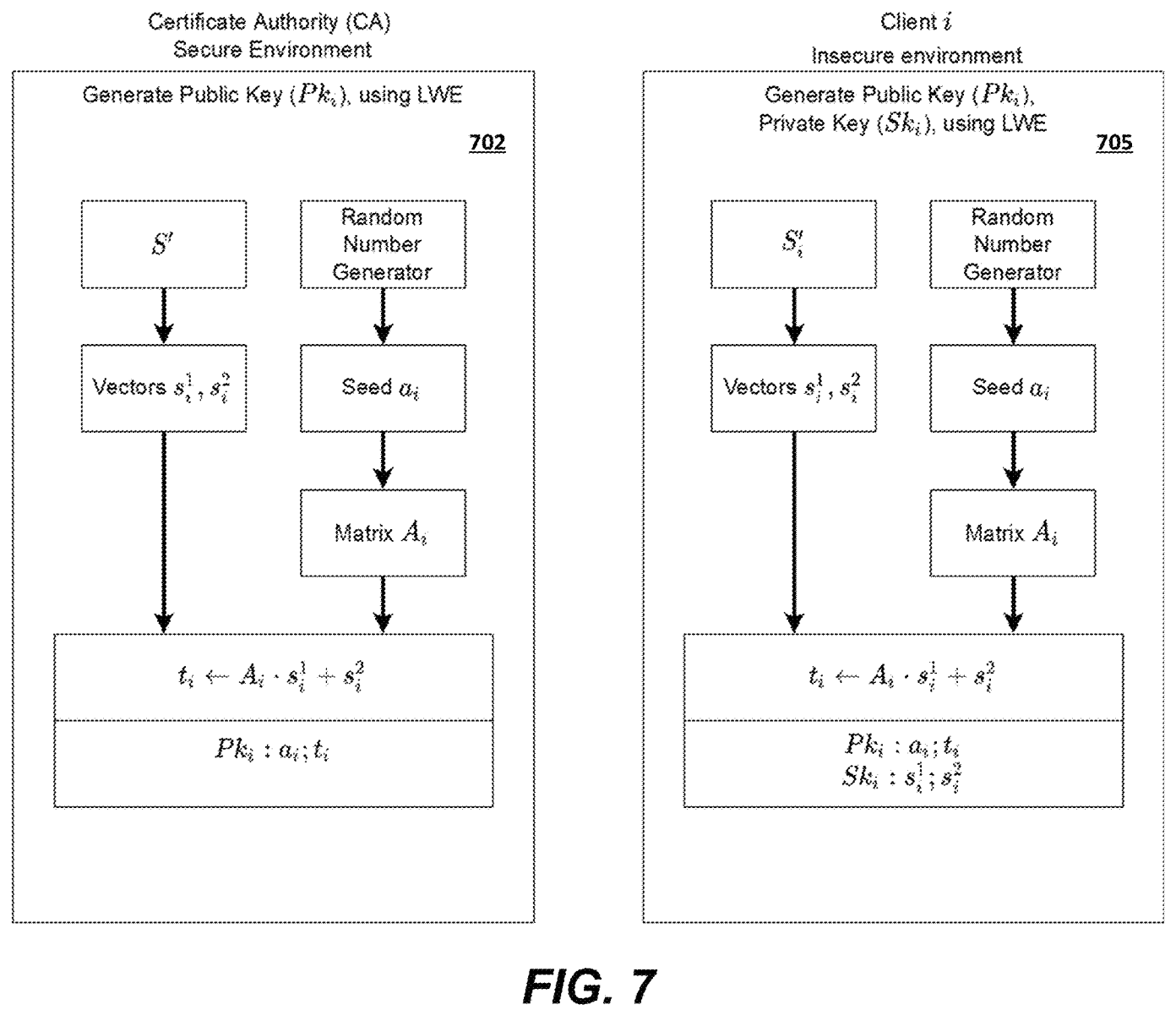

Certificate Authority (CA)
Secure Environment

Generate Public Key ($Pk_i$), using LWE

702

Random Number Generator

Seed $a_i$

Matrix $A_i$ $S'$

Vectors $s_i^1, s_i^2$ $t_i \leftarrow A_i \cdot s_i^1 + s_i^2$ $Pk_i : a_i ; t_i$ Client $i$
Insecure environment Generate Public Key ($Pk_i$), Private Key ($Sk_i$), using LWE

705

Random Number Generator

Seed $a_i$

Matrix $A_i$ $S'_i$

Vectors $s_i^1, s_i^2$ $t_i \leftarrow A_i \cdot s_i^1 + s_i^2$ $Pk_i : a_i ; t_i$
$Sk_i : s_i^1 ; s_i^2$

FIG. 7

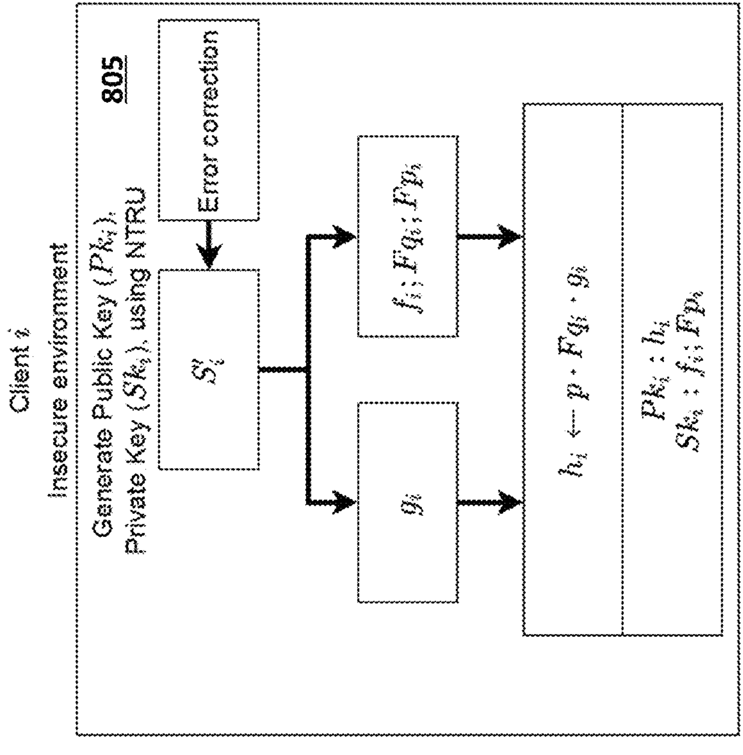
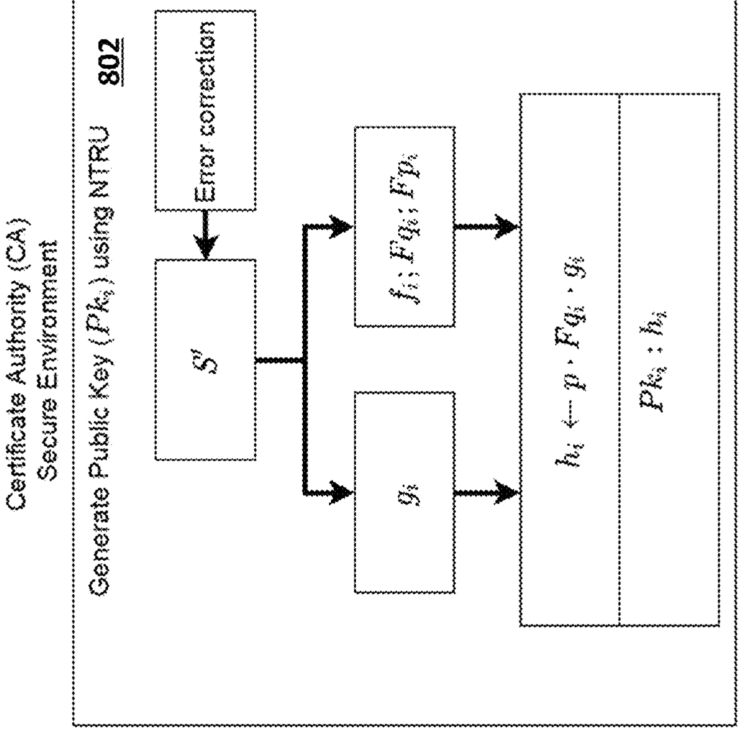
FIG. 8

SALTED HASHING METHOD FOR RESPONSE-BASED CRYPTOGRAPHY

CROSS-REFERENCE TO RELATED APPLICATION(S)

The present application claims priority to U.S. Provisional Application 63/225,342 entitled SALTED HASHING METHOD FOR RESPONSE-BASED CRYPTOGRAPHY, filed on Jul. 23, 2021, the entirety of which is incorporated herein by reference.

STATEMENT REGARDING FEDERALLY-SPONSORED RESEARCH

This disclosure was supported by the United States Government under Grant No. FA8750-19-2-0503 awarded by the Information Directorate under AFRL. The Government may have certain rights to inventions described herein.

BACKGROUND OF THE INVENTION

Physical unclonable functions (PUFs) that are unique to a device allow an authentication system to challenge a client seeking authentication, receive a response generated by the client using a PUF device, and then compare the received with a stored response previously received from the client or derived from characteristics of the PUF device and verifying that the two responses match. PUF technologies take advantage of unique characteristics of each device caused by natural manufacturing variations unique to that device. When clients seeking authentication have arrays of PUF devices, a number of possible challenge responses may be generated in response to varying challenges. The generation of challenge responses may need to be reproducible, predictable, and easy to recognize during the authentication process for the challenge-response authentication to be useful. PUF responses, generated by a client device having a PUF may be used to generate encryption keys, and initial PUF responses, previously measured and stored in a database or image in communication with or in possession of a server device, may be used to generate a matching encryption key. The server and client side keys may to used to support encrypted communication between the server and client devices. Additionally, server and client side keys may be compared to authenticate a client device.

PUF responses may vary over time as the PUF device ages, degrades, or is subject to temperature changes. These drift mechanisms may cause a PUF, for example a PUF in a client device, to return different responses than the responses stored at the server device, which may have been measured under different conditions. Mismatch between the client PUF responses and the initial responses may prevent authentication between client and server and may result in mismatched keys being generated on the client and server sides. The instant disclosure is directed at solutions to this problem.

BRIEF SUMMARY

Embodiments of the invention are directed to a system for cryptographic key generation between a server and a client. The client has a physical-unclonable-function ("PUF") array of addressable of PUF devices and a server has an image of the PUF, which is a database of previously measured physical characteristics of PUF devices of the addressable array of PUF devices on the client device. According to an exemplary method, the server generates a PUF challenge, which is a set of instructions identifying addresses of a range of PUF devices in the client's array. Optionally, the instructions may also specify measurement conditions under which the client is to measure the PUF devices identified by the instructions. The instructions are sent to the client as a handshake message, and the client measures its PUF devices resulting in a response bitstream. The server then retrieves the corresponding response bitstream from its image of the PUF. The client hashes its measured responses and transmits it to the server. The server hashes its own retrieved responses, and then compares its hash to the one received from the client. If the two do not match, the server iteratively flip bits in its response bitstream, and hashes the result until a match is found. At this point, each device has the same seed. Each device then applies a salting algorithm to its respective seed. Optionally, each device checks to see whether its respective seed is suitable for key generation under a predetermined keying algorithm. If not, each device may modify it seed in accordance to predetermined algorithms, such as bit shifting. Once a matching pair of suitable seeds has been arrived at by each device, the devices use a predetermined keying algorithm to generate keys.

In other embodiments, segmentation of the response hash and ignoring or masking known erratic PUF devices may incorporated into the methods above.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

FIG. 7 is a system diagram including process flow steps illustrating the use of a salted hashing protocol for LWE algorithms and for generation of public/private keys on a client and a validated public key on a server.

FIG. 8 is a system diagram including process flow steps illustrating the use of a salted hashing protocol for NTRU algorithms and for generation of public/private keys on a client and a validated public key on a server.

DETAILED DESCRIPTION

Figure 1:
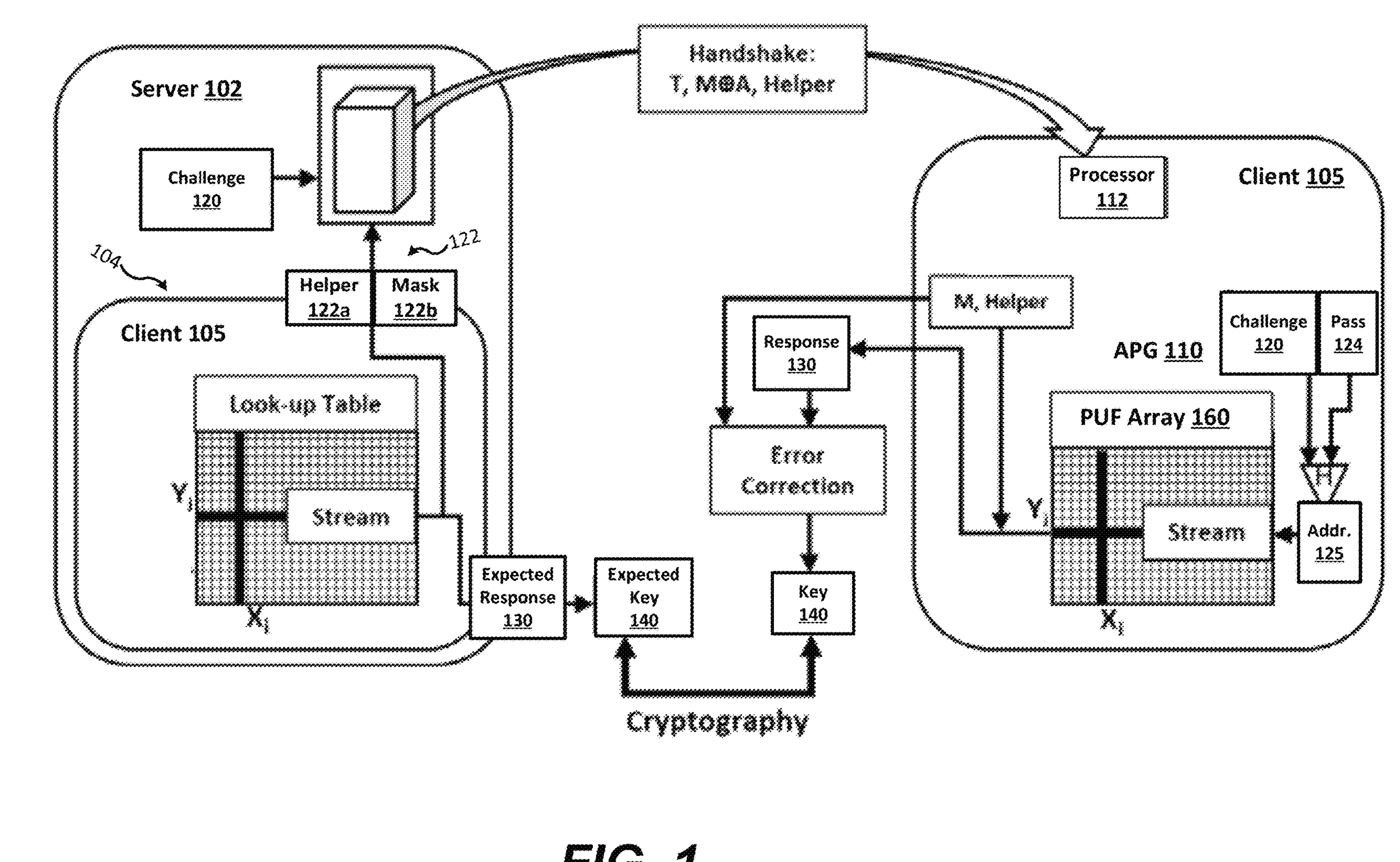
FIG. 1 depicts an enrollment procedure wherein a server issues challenges to clients having PUF arrays and stores responses to those challenges for use in subsequent authentication of the clients, according to one embodiment.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional systems and methods for challenge-response authentication have disadvantages. For example, when the server and the client communicate over an insecure channel, both the challenges and the challenge responses may be intercepted, providing information which may be useful to an attacker. PUF-based challenge response authentication schemes use physical devices ("PUF devices") having measurable characteristics which only a client in possession of those devices can measure as a "fingerprint." A server which stores or has access to previous measurements of the devices ("initial responses") issues a challenge to the client which instructs the client to measure the devices (or a subset) and generate a response to the challenge which includes the measurements or other information derived from the measurements. For example, a server might send a challenge to which the client responds by measuring a particular subset of devices and then performing a mathematical operation on those measurements. Some PUF devices may have more than one measurable characteristic which can be used to generate a challenge response. As an example, an array of transistors having slight performance variations due to variation in manufacturing processes may be used. Measurable characteristics of such transistors might include threshold voltages, channel resistances, and the like. The client may then encode or otherwise transform measurements of such characteristics into a response.

Conventional PUF-based challenge response systems may experience errors due to nondeterministic behavior of individual devices in PUF arrays. Such errors may be due to various drift factors, such as variations in the measurement conditions of the client side PUF, or other changes that may occur at the client side PUF over time. By way of example, if a PUF is challenged at a different temperature than the temperature at which the initial responses were measured, the measured response will be different than the initially measured response. Conventionally, in an authentication paradigm, a slightly different-than-expected client PUF response may still be used for authentication if it sufficiently similar to an expected response stored at the server. However, cryptographic key generation requires a closer match between client and server PUF responses. Thus, even if these error rates are acceptable for authentication purposes, they are often much too high for other applications such as allowing two devices to agree on a shared encryption key.

Accordingly, embodiments disclosed herein address these and other shortcomings by using physical unclonable function (PUF) generators (APGs) with improved error rates to enable simultaneous authentication of client devices and generation of encryption keys, thereby allowing one or more devices to reliably exchange information securely over potentially insecure channels without requiring excessive latencies and use of computing resources.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized, and the pixels may be used as an addressable PUF array. A good PUF should be predictable, and subsequent responses to the same challenge should be similar to each other (and preferably identical). The quantification of the quality of the PUF may be given by the Hamming distances (or another similarity metric) between initial responses and subsequent responses, also defined as the challenge-response pair (CRP) error rate. Hamming distance is used throughout this disclosure as a useful measure of the similarity or difference between two strings (such as challenges and responses). However, it should be understood that other measures of the similarity or difference between two strings may be used and that Hamming distances are used herein for the purposes of illustration. The Hamming distance may be particularly useful when PUF responses are sequential strings with each element generated by accessing a distinct PUF device belonging to an array. In this instance, the Hamming distance between a response to a challenge and an earlier response (or expected response) to that same challenge will indicate the number of PUF devices which produced unexpected outputs.

According to various embodiments, a PUF-enabled authentication protocol includes the following stages: (1) Enrollment, (2) Handshaking, and (3) Authentication/Encryption Key generation. These stages are described below, beginning with reference to FIG. 1 illustrating an example environment 100 in which embodiments disclosed herein may be practiced. The environment 100 includes a server 102 and one or more client devices 105. The server 102 manages a database 104 which may be stored in memory of the server 102. The database 104 stores a set of initial challenge responses, which may be generated in response to challenges issued by the server 102 to the client 105, each of which may respond to the challenges by accessing a respective PUF array 160. Alternatively, the server 102 may be otherwise provided with information suitable to generate the initial challenge responses 130.

The client 105 has an addressable PUF generator 110. The PUF array 160 may form part of the APG 110 as described further below. The APG 110 may contain additional processing circuitry and execute instructions for generating challenge responses. Enrollment is performed for each client 105 in a secure environment. After enrollment, a constellation of clients 105 may operate in an insecure environment and communicate with each other over public networks. Secure information should be encrypted. The PUF array 160 of a client 105 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 160) may be unique, even if the PUF arrays are mass-produced by a process designed to produce nominally identical devices. The PUF array 160 (shown as a 2D-array of cells) of a client 105 may be accessed by the client 105 which receives challenges 120 (originating in this example from the server 102). The APG 110 responds by to challenges 120 by generating responses 130 using measured characteristics of one or more PUF devices within the PUF array 160 identified by the challenge 120 or derived from it using instructions stored by the APG 110.

Each client 105 has an APG 110 containing a PUF array 160 that is unique to that client 105. The APG 110 of a client 105 may be used to generate numerous responses 130 (i.e., responses unique to that client 105). These responses 130 cannot be replicated by an attacker without physical access to the PUF array 160. During the Enrollment stage, the server 102 may obtain the initial responses 130 for each client 105 by generating all possible challenges 120 and storing responses 130 to those challenges 120 generated by each APG 110 in a database 104. Alternatively, the server 102 may be otherwise supplied with characteristics of each PUF array 160 sufficient to generate the expected responses 130. The processor 112 may include instructions to combine information from the challenge 120 with additional information (such as a user password 124) and pass the combination through a hash function 121 the result to produce the address 125 (or range of addresses) within the PUF array 160 to measure in order to generate the proper response 130.

After the clients 105 are enrolled with the server 102, embodiments disclosed herein may be utilized to authenticate the client 105 and produce an encryption key which the server 102 and client 105 may use to communicate securely. First, the server 102 and a client 105 enter the Handshaking stage. In the Handshaking stage an objective is for the server 102 to transmit the information needed to identify a particular portion of the PUF array 160 of the client 105. Both the server 102 and the client 105 can independently produce a response to the challenge: the server can lookup information about the PUF array 160 obtained during enrollment (or otherwise supplied to the server 102) and the client 105 can retrieve the same information by using the APG 110 to access the PUF array 160.

During Handshaking, the server 102 issues a challenge 120 to the APG 110 of the client 105. This challenge 120 is used by the APG 110 to identify the portion of the devices belonging to the PUF array 160 to access. This challenge 120 may be a random number. In some embodiments such as embodiment 100, the server 102 and the client 105 may have access to the same random number generator or may have synchronized random number generators. In such embodiments, the server 102 does not need to transmit the challenge 120 to the client 105 in order for the client 105 to generate the challenge response 130 using the APG 110.

In embodiment 100 and similar embodiments the ability of the client 105 to generate the challenge response 130 may be protected by a password 124. In such embodiments, the address 125 specifying which device(s) in the PUF array 160 to access may be produced by combining the challenge 120 with the password 124. As a non-limiting example, the client 105 may input the password and the challenge into a hashing function to produce the address in the PUF array 160. As an example, if the PUF array 160 is represented as a two-dimensional array containing 256 rows and 256 columns, 8 bits of the message digest can be used to find the first coordinate X in the PUF array 160; the following 8 bits can be used to find the second coordinate Y.

As discussed above, the measurement of characteristics of individual PUF devices may not be perfectly deterministic. As part of the Handshaking process, the server 102 may send additional information 122 to the client 105 for use in making generation of the challenge response 130 more reliable. The additional information 122 may include error correction instructions (ECC) **122*a* (sometimes called a "helper" or "helper instructions") and/or masking instructions 122*b*. The error correction instructions 122*a* may include a checksum or other error-correcting information for use with error-correcting codes, or other information or instructions used in response generation schemes to be discussed later below. The masking instructions 122*b* instruct the APG 110 to exclude cells which the server 102 characterized as unreliable cells during Enrollment. The APG 110 may generate corrected responses 132 which simply exclude measurements of the unreliable cells. Alternatively, the processor 112 may measure additional cells to ensure that the corrected challenge responses 132 are of a specified length. The processor 112 may store instructions for selecting the additional cells to measure or may receive such instructions as part of the additional information 122**.

Upon receiving the challenge response 130, the APG 110 may use the additional information 122 to generate corrected responses 132. Use of the additional information 122 and other methods of improving the reliability of the APG 110 will be discussed further below. The corrected responses 132 may be used directly as encryption keys 140 or may otherwise be used to derive the encryption keys 140. The server 102 may similarly independently produce the encryption keys 140 using the initial responses 130 stored in the database 104. The server 102 and the client 105 may then communicate securely by encrypting messages using the shared encryption keys 140 or encryption keys derived from them (e.g., public keys corresponding to the keys 140 according to an asymmetric cryptographic scheme).

The server 102 can authenticate a client 105 by issuing the challenge 120 to the client 105 and then comparing the corrected challenge response 132 generated by APG 110 with the initial response to that challenge stored by the server 102 for that client 105 (e.g., initial challenge responses 130) or determine that the corrected challenge response 232 is consistent with the initial challenge response 130 by comparing information derived from the corrected challenge responses 132 with information derived similarly by the server 102 from one of the initial challenge responses 130 corresponding to the challenge 120 issued by the server. The server 102 may require that the corrected response 132 is identical to the expected response to the challenge 120 (i.e., the initial response 130 corresponding to the challenge 120) in order to authenticate the client 105. Alternatively, the server 102 may accept a corrected response 132 with a Hamming distance (or a value of another distance metric) less than a predetermined maximum value from the expected response as evidence that the challenge response 130 is consistent with the expected response. For example, the server 102 may infer that the client 105 has generated a response which differs by less than a predetermined maximum number of symbols from the initial response 130 and determine that the challenge response 130 is consistent with the initial response 130 (i.e., was generated by a client 105 in possession of the same PUF array used to obtain the initial response 130). When the CRP error rates are relatively low, the responses can be used as part of authentication protocols. In such cases, Hamming distances between responses and the expected responses as large as 10% of the total response length may still be used to provide acceptable false-accept and false-reject rates (FRR and FAR). When the CRP error rates are too high, the use of error-correcting methods may be used to improve both FAR and FRR.

As noted above, it is ordinarily desirable that the CRP error rate of a given APG is low. This becomes even more important if the responses 130 are used to generated encryption keys, as contemplated herein. This is because even a single-bit error in an encryption key may produce a ciphertext which cannot be correctly decrypted. Although the use of error correction instructions (e.g., the error correction instructions 122*a*) can reduce error rates, such approaches have disadvantages. First, the client devices (e.g., the clients 105) need to consume additional computing resources to implement the error correction instructions (e.g., error-correcting codes, fuzzy extractors, et al.). However, in some applications doing so may result in increased complexity and power consumption and may be impractical (e.g., in IoT and other low-power devices). Second, such protocols increase the vulnerability to side-channel attacks, differential power analysis, and potential exposure of the error corrections. In addition, the use of APGs to generate challenge responses for use in generating encryption keys is more challenging than using APGs to generate responses for authentication. For example, if the server 102 generates an encryption key (e.g., an encryption key 140) using one of the initial responses 130 and a client 105 attempts to generate the same encryption key from responding to an appropriate challenge 120, the process will fail if the client-generated encryption key differs from the server-generated encryption key by even a single bit. However, typical PUF arrays may exhibit CRP errors at rates of approximately 3-10% due to temperature changes, noise sources, aging, or other parameter drifts. Thus, it is important to improve CRP error rates or correct CRP errors. Embodiments disclosed herein may therefore employ various other schemes for reducing CRP error rates.

In some embodiments, ternary PUF schemes may include characterizing each PUF device in a PUF array (e.g., a PUF array 160). During Enrollment, the server issues each possible challenge repeatedly and tracks the statistical distribution of values included in the challenge responses The server then assigns the elements of each challenge response corresponding to individual PUF devices to one of three ternary states, which will be referred to using the ternary digits {–, x, +}. Measured device characteristics which fall within a first range of values are assigned the ternary value '–'. Measured device characteristics which fall within a second range of values exclusive of the first range are assigned the ternary value '+'. Measured device characteristics which fall within a third range of values exclusive of the first range and the second range are assigned the ternary value 'x'.

For example, if the PUF devices are SRAM cells, the measured device characteristics may be the frequency of the binary data states stored by the SRAM cells after power cycling. Cells which are always (or almost always) in the '0' state may be assigned to the '–' ternary state, while cells which always in the '1' state may be assigned to the '+' ternary state. Meanwhile, cells which are "unreliable" fluctuate between the '0' and '1' state may be assigned to the 'x' ternary state. The resulting ternary representations may be stored by the server in the database as initial challenge responses for the clients. The server may disregard values generated using unreliable cells when comparing challenge responses to expected challenge response. In some embodiments, the may send instructions to exclude previously-characterized unreliable cells to the client. For example, if a challenge requires a 256-bit response the instructions may instruct the client to select the first 256 devices which are not excluded from the challenge generation process started at a given address The CRP rate can be significantly reduced using this approach when a sufficiently large number of initial responses are gathered in response to each challenge. In some embodiments the server shares the location of the unreliable cells with the clients during the Enrollment process, thereby reducing the size of the instructions transmitted by the server during subsequent authentication and generation of challenge responses by the clients since the clients are able to store the information necessary to exclude the unreliable cells from the challenge generation process.

The value of using the ternary PUF methods above has been demonstrated with SRAM PUF devices based on commercially available SRAM. SRAM PUFs exploit power-off/power-on cycles. Due to manufacturing variations, the flip-flop of each SRAM cell will randomly power up in the '0' state or the '1' state. The vast majority of the cells respond in a predictable way, therefore acting as a "fingerprint" of the device. The SRAM PUFs characterized exhibited a cumulative 3-5% CRP rate after each power-off/power-on cycle. The memory cells were then subjected to successive power-off/power-on cycles and cells exhibiting inconsistent behavior were deemed unreliable and represented by the ternary 'x' state as described above. After 50 cycles, the 'x' state was assigned to 10% of the cells. For the remaining cells which were not assigned the 'x' state, the error rate was in the 0.01-0.03% range.

As is explained above, the use of helper instructions or ECC, alone or in combination with the blanking of pre-characterized erratic cells, has been suggested as a solution to the problem of key mismatch from erratic PUFs. In addition to the security disadvantages of the use of helper instructions discussed above, these ECC solutions impose a significant processing burden on the client-side processor. This burden may not be practical in certain applications where the client is operating in a low power setting, for example, in a mobile device or in an internet-of-things setting. Other solutions to relieve the client device of this processing burden have been suggested. These solutions involve "response-based cryptography" (RBC), and are disclosed, generally, at U.S. patent application Ser. Nos. 16/683,943 and 16/598,985, which are incorporated herein by reference in their entirety. Under a version of RBC, rather than sending the client helper instructions requiring a client processor to compute corrections to possibly erratic PUF responses, the processing burden for correction is offloaded to the server. The server searches for a set of PUF responses that match the PUF responses measured by the client in response to the challenge. This search may involve retrieving a set of expected responses from the server database, generating a cryptographic key, receiving a cryptographic key from the client (generated with the measured responses) and comparing the keys. If the keys do not match, the server than generates permutations of the expected PUF responses and generates new keys from the permutations. This search, through various permutations on expected PUF responses, continues until a key is generated that matches the one received from the client. This process is described in additional detail below in reference to FIG. 2.

In typical public key infrastructure (PKI), client devices store private keys in non-volatile memory (e.g., disk), and this can be exploited by attackers. To eliminate this threat, it is helpful to store private keys in volatile memory, or better yet, to generate them on-demand. This storage or generation can occur in physical unclonable functions (PUFs) which are then embedded in client devices. Since the output of a PUF varies due to variations in the manufacturing process, they can act as a client's "fingerprint," wherein all client devices will have differing fingerprints. To ensure that a client device can be authenticated, initial PUF fingerprints, called challenges, are stored on a server during a secure enrollment process. Then, when the client device containing the PUF is deployed, it can authenticate with the server by generating new fingerprints called responses. These responses are compared with the initially recorded challenges. When the challenges and responses differ by a sufficiently small bit error rate, the client is authenticated.

Using PUFs can replace storing private keys in non-volatile memory, and they have the added benefit of allowing for private keys to be generated on-demand where a new client private/public key pair is created once per transaction. Thus, even if an attacker were able to recover a client's private key, it would become invalid on a short timescale.

As is set forth above, PUFs may produce erratic bit streams. To create public/private keys from these bit streams, one approach, discussed above in reference to FIG. 1, is to use helper functions and/or error correction codes to correct any bit mismatches output by the PUF. However, many low-powered devices, particularly those in the Internet of Things (IoTs), do not have the computational power to perform this correction procedure. The alternative to this approach is to use response-based cryptography (RBC), where the client produces erratic keys as a function of the PUF. Then, a server with greater computational capabilities, or a cluster of computer nodes can be used to perform a parallel search over the key space to determine whether the erratic key produced by the client is valid.

Figure 2:
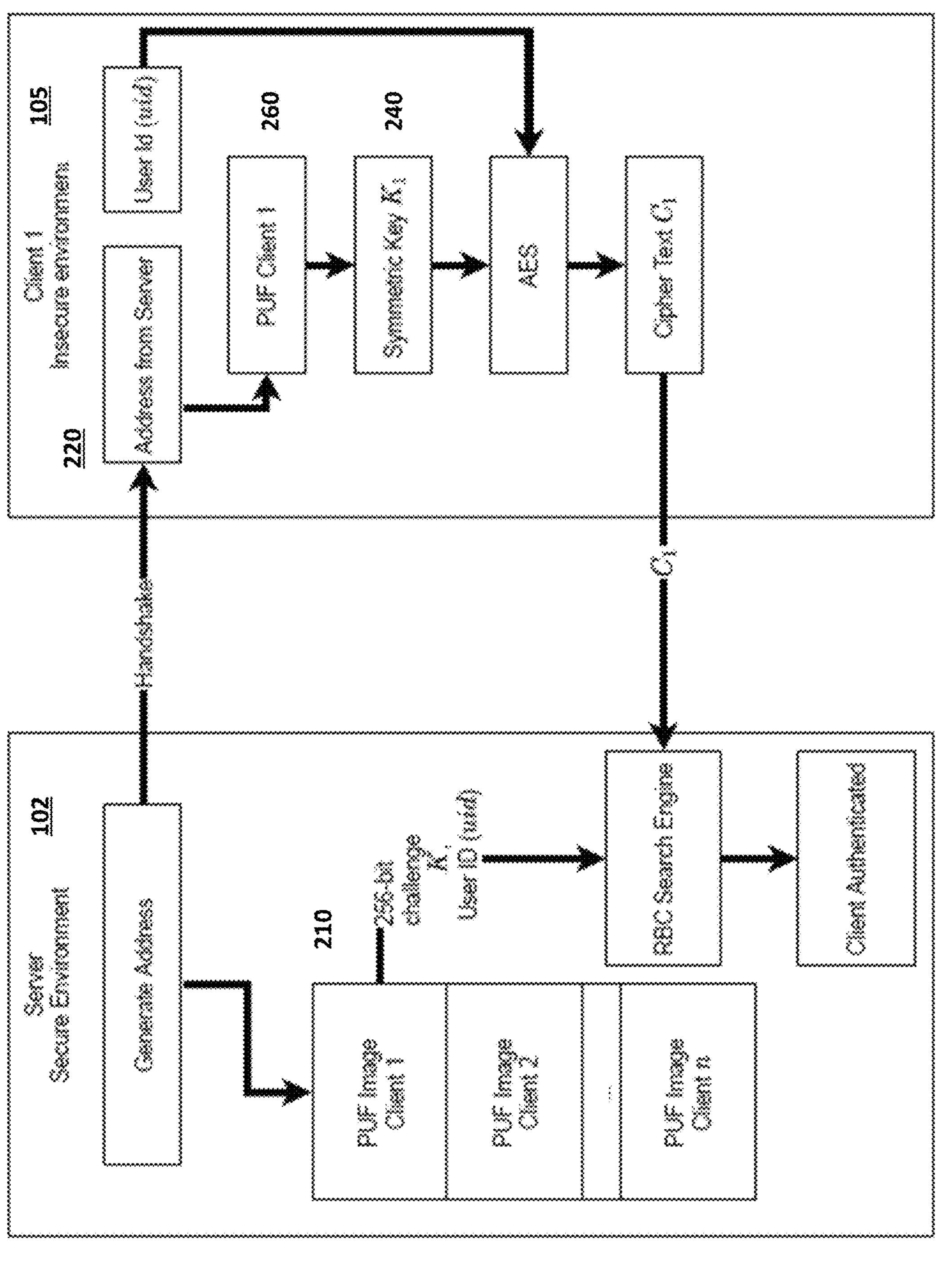
FIG. 2 is a block diagram of a client device with an addressable PUF generator (APGs), interacting with a server to independently generate shared encryption keys using response based cryptography (RBC)

FIG. 2 shows an arrangement for carrying out an exemplary RBC protocol. As above, the arrangement of FIG. 2 has a client 102 and a server 105. Each device may include a microprocessor capable of executing computer readable instructions to carry out the process and method steps disclosed below. These instructions may be stored in volatile or non-volatile memory in electronic communication with each processor. In the exemplary arrangement of FIG. 2, an RBC protocol is demonstrated using the example of Advanced Encryption Standard (AES), similarly to that outlined in the prior applications cited above.

In the example of FIG. 2, the key search occurs within the secure server. A client 105, which may be one of many similar clients, wanting to authenticate with the server performs a handshake. This handshake exchanges PUF address information between the client and server. The handshake may include a list of PUF addresses, for example, a list of PUF addresses generated by or with a random number generator, or information by which a list of addresses may be generated (e.g., by hashing, bit expansion, or other methods.) The handshake information may also specify measurement conditions under which the specified addresses are to be measured. The handshake information may originate from either device, although in the illustrated example, the server passes address information 220 to the client. In generating the address list in a handshake message, the client or the server may omit or mask known erratic addresses. Alternatively, this masking may occur in parallel on both client and server sides, where the client does not measure known erratic addresses in the handshake message, and the server does not retrieve responses from the same known erratic addresses.

The client's AGP including the PUF 260 is measured by the client in accordance with the instructions passed by the handshake. For example, where the handshake information specifies address information, the addresses of the individual PUF devices in the client's AGP PUF array 260 are measured or read in accordance with the measurement condition information specified. The result of the reading or measurement of the PUF is a bitstream representing the responses of the individual PUF devices measured. This bitstream is used as, or in connection with further operations, to generate an encryption key, K_1 240 for symmetric encryption. The symmetric key, K_1, is used as input into AES, which the client uses to encrypt some plaintext message. An exemplary plaintext message is a user_id associated with the client, of which server 102 may have advanced knowledge, stored in its database. In accordance with AES, client 105 encrypts the user_id with K_1 to create a cipher, C_1. The client then sends the cipher to the server.

On the server side, the server retrieves responses from a database containing a PUF image 210 corresponding to the addresses and measurement conditions specified in the handshake. The server then uses the retrieved responses (which were the initial responses from PUF 260 measured during enrollment) and uses that bitstream as or to generate an encryption key K. This encryption key represents the key that would be generated ideally by PUF 260 if it did not have any erratic responses. The server then retrieves the same plaintext used by the client, which the server has access to a priori (i.e., because it is stored in the server's database). In this example, the plaintext is a user_id associated with the client device. The server then encrypts the plaintext with the key K, resulting in a cipher C, which is compared with the received cipher C_1.

In cases where some PUF responses are erratic, which will often the case on the first iteration of the RBC process, C will not match C_1. In these cases, server 102 begins a search for a key that matches the key that was apparently generated by the client. An exemplary algorithm for an RBC search is outlined in FIG. 3. The steps of this algorithm, performed are as follows:

1. The server reads the PUF image for the client at the specified address to retrieve the client's challenge, K.
2. The server then takes K and the user ID, uid, and encrypts uid using K to create the cipher, C.
3. If the server's cipher C and client's cipher $C_1$ match, then the client is authenticated.
4. Otherwise, the RBC search is conducted starting at a Hamming distance d=1, where K is permuted by flipping d bits in K. The server generates a new cipher C by using AES to encrypt the client's user ID (uid) and the permuted key K.
5. The server continues permuting K until it finds ciphers (C and $C_1$) that match at a Hamming distance d. If a match is found, the client is authenticated.
6. If the server does not find ciphers (C and $C_1$) that match, the Hamming distance, d, is increased by 1, and the algorithm starts again at step 4 above.

Optionally, in addition to the above steps, the algorithm may apply a time-out threshold, T, by which it must authenticate a client. Because the error rate could potentially be high, if the client generates a bit stream with a high error rate, the search may be intractable within a reasonable time threshold T, as the complexity scales exponentially with d. If a timeout occurs, the server simply may simply restart the process with a handshake where the server sends the client a new set of PUF addresses for which to generate a new response bit stream, and the process is restarted.

As is discussed above, blanking or ignoring known erratic cells (e.g., that are discovered during enrollment), may be used to reduce the bit error rate of client-measured PUF responses. This and similar techniques may be used to further reduce bit error rate for PUFS having an intrinsically large error rate, thus reducing the probability of an intractable search. To address the erratic PUF problem, the RBC protocol may use Ternary Addressable Public Key Infrastructure (TAPKI). In a TAPKI embodiment, the system ignores the cells in the PUF that have a high error rate, and these cells are masked in the PUF image stored on the server and the PUF in the client device. This ensures that the RBC search is generally tractable while still being robust to the erratic nature of PUF technology.

Erratic cells have a partial advantage in that they result in the client PUF intrinsically adding noise to response bitstream K_1 (240), which may enhance security so long as this does not in an intractable search. However, if the PUF has a low error rate and the cells are masked using the TAPKI method described above, then it may be beneficial to inject noise into the K_1 bitstream. This may be useful to generate a stream of a predetermined bit length required for certain encryption algorithms. Thus, in certain embodiments, noise may be injuncted into the PUF response bit stream to increase the error rate while generating a 256-bit stream. In certain embodiments, the noise is injected at the end of the measured bitstream. In other embodiments, the noise is injected in the bitstream at locations corresponding to the addresses of known erratic cells. The noise bit may be generated by a random number at the client. On the server side, the noise bit's location is known (e.g., in cases where they are tacked onto the end of the bitstream), and those bits are ignored in the RBC search algorithm.

Embodiments described herein, generally, seek to reduce the search complexity of the RBC search on the server side of the system. While the server is presumed to have access to more powerful and power intensive computational resources (e.g., parallel processors), reducing the server side search burden is still advantageous because doing so decreases the probability of an intractable search. This, in turn, reduces the likelihood of having to repeat handshake cycles. To provide context for the disclosure of the salted hashing methods described below, it is helpful to first discuss the complexity of the search process and prior-disclosed methods of reducing complexity.

Consider a bit stream generated from a client's PUF that has d flipped bits relative to the server's PUF image. Recall that we assume the PUF outputs a 256-bit stream. Therefore, the upper bound number of keys, u, that need to be searched by the server is as follows:

$$u(d) = \sum_{i=0}^{d} \binom{256}{i}. \quad \text{Equation 1}$$

Now, consider an opponent that would like to guess the client's symmetric key by permuting a 256-bit bit stream, and generating public/private key pairs. Because the opponent does not know the starting position of the bit stream (i.e., the bits stored in the server's PUF image for the client), the worst-case number of keys that need to be searched by the opponent is as follows:

$$o_u = \sum_{i=0}^{256} \binom{256}{i}. \quad \text{Equation 2}$$

Comparing Equations 1 and 2, the server's search space is tractable assuming d is sufficiently low (i.e., the PUF generated bit streams with limited variability), whereas the opponent's search space is intractable because the opponent must search the entire 256-bit key space up to d=256. Furthermore, given that the systems described herein allow for one-time keys or using one key per transaction, the opponent's search will be ineffectual as the key will change well before the opponent's search can be carried out.

Equation 1 illustrates the complexity of the server's search in the worst-case scenario, where all keys up to a Hamming distance d need to be searched. However, on average, a key will be found halfway through the key space at Hamming distance d. The number of keys that need to be searched are as follows:

$$a(d) = \sum_{i=0}^{d-1} \binom{256}{i} + \frac{\binom{256}{d}}{2}. \quad \text{Equation 3}$$

Likewise, the average case search for an opponent is as follows:

$$o_a = \frac{1}{2}\sum_{i=0}^{256}\binom{256}{i}. \quad \text{Equation 4}$$

As described in U.S. patent application Ser. No. 16/683,943 "Unequally Powered Cryptography Using Physical Unclonable Functions," the error rate that is tolerable is roughly 5-7 bits for a 256-bit key. Higher error rates will be intractable even with significant compute capabilities, such as a cluster of compute nodes, and this is evidenced by the exponential search complexity outlined in Equations 1 and 3.

To address the bit error rate limitation, U.S. patent application Ser. No. 16/683,943 proposes a segmentation scheme, where the 256-bit client key is segmented into g subkeys. When the client wishes to authenticate with the server, it sends the server g ciphers, where only 256/g bits are searched in each subkey (this scheme assumes that g evenly divides 256). The bits in the subkeys that are not searched in each key use an error-free pad that is only known to the server and the client. The server carries out the RBC search using g subkeys corresponding to g ciphers. Therefore, the upper bound complexity of the search occurs when all the errors fall within a single subkey. The upper bound number of keys searched with segmentation is as follows:

$$u_s(d, g) = (g-1) + \sum_{i=0}^{d}\binom{256/g}{i}, \quad \text{Equation 5}$$

where $$g \le \frac{256}{2d}.$$

Here, we constrain $$g \le \frac{256}{2d}$$

for 256-bit keys because if $$g > \frac{256}{2d},$$

then the upper bound does not hold for those values of d and g.

Figure 4:
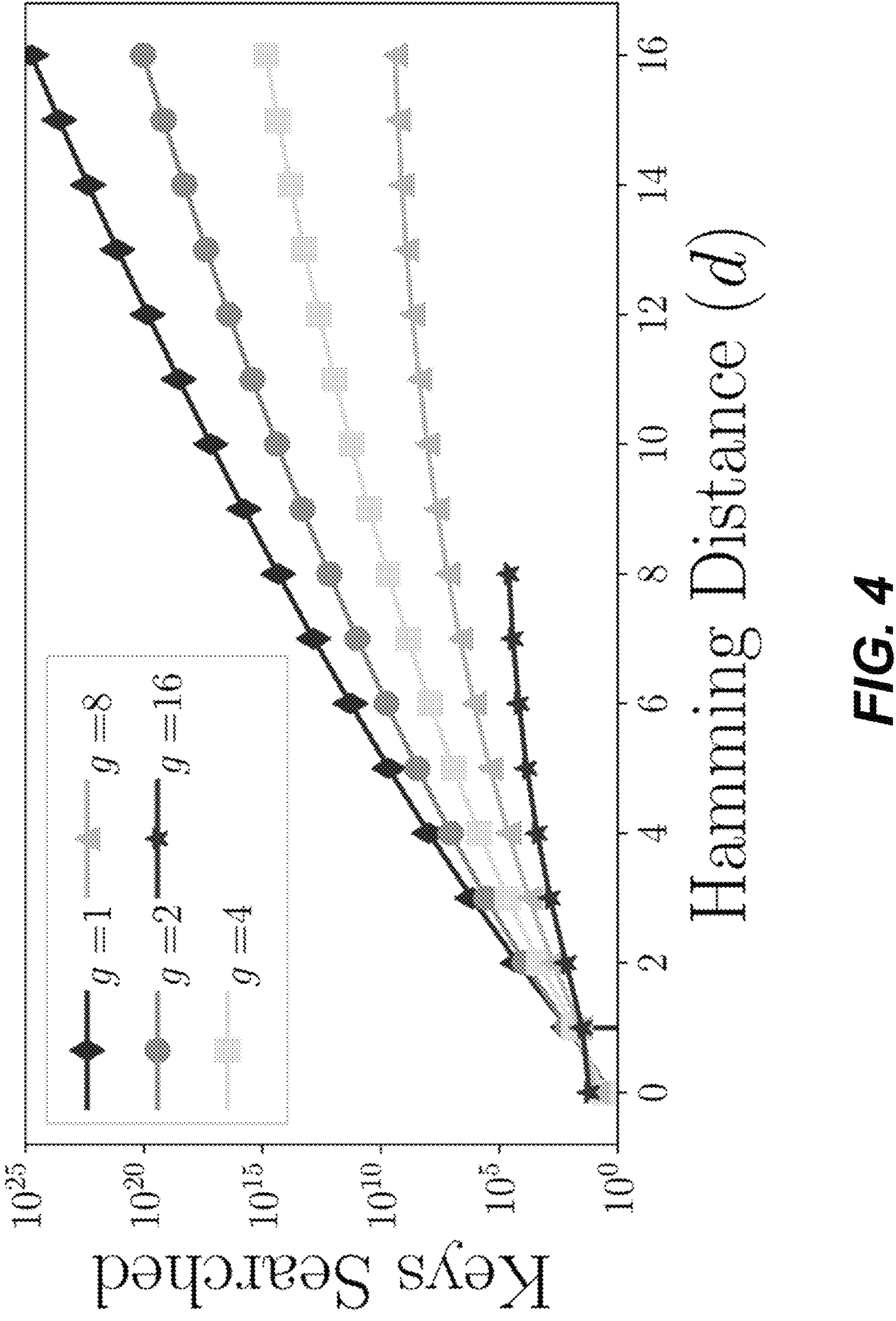
FIG. 4 is a plot illustrating the RBC search burden with and without key segmentation.

FIG. 4 shows the number of keys searched as a function of Hamming distance where the segmentation level $g \in \{1, 2, 4, 8, 16\}$ is shown as the curves ordered from top to bottom, respectively. A value of g=1 indicates no segmentation, and the average case is shown in Equation 3. Values of g>1 indicate that segmentation is utilized, and Equation 5 is plotted. Using segmentation allows for a larger error tolerance while simultaneously reducing the search space with increasing g. Consider that an opponent will not know the starting position of any of the subkeys. Therefore, the opponent will need to search g·o_a keys on average (see Equation 4).

Disclosed below are a number of improved RBC search methods that reduce the computational load on both the client and server sides. As a high level overview, according to the methods described herein, rather than running an encryption algorithm on both the client and server sides, and then comparing the encrypted ciphertext to determine whether the keys match, in inventive methods, the client hashes the PUF response, and the server hashes the retrieved response from the PUF image. These hashes are converted to message digests, which are then compared. If the message digests to not match, the server permutes the retrieved responses, hashes the permutation, and the comparison step repeats. These steps iterate, as described above, until a matching message digest is found. At this point, both device salt their respective responses (the client salts the measured response, and the server salts the permuted retrieved responses that resulted in the match), and the salted bitstreams are used by each to device to generate a matching key pair. These methods are advantageous relative to previously described methods, because they avoid the requirement for multiple, iterative encryption steps at the server with candidate keys, which reduces the processor burden at the server.

Figure 3:
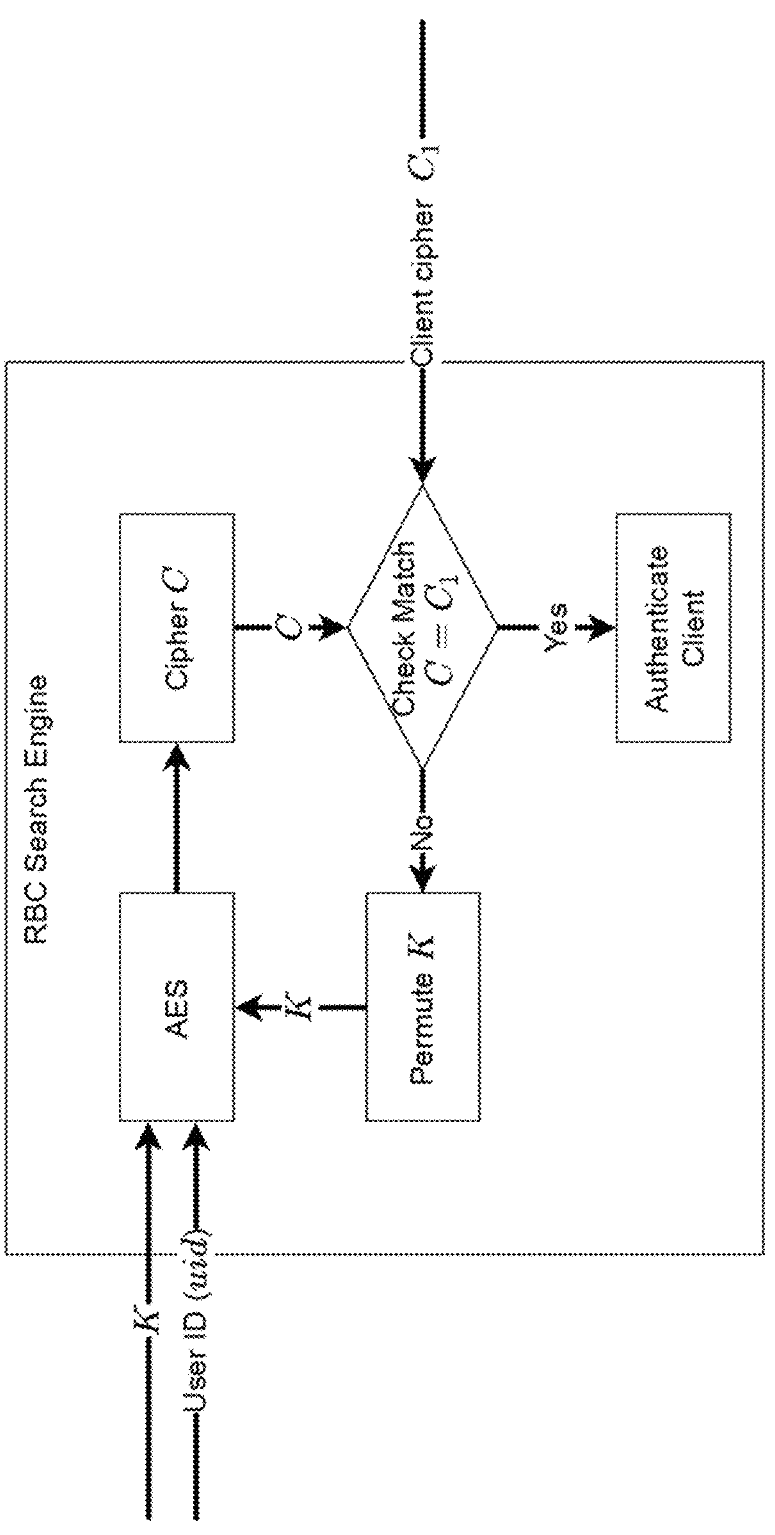
FIG. 3 is a flow diagram illustrating steps of an RBC search process.

As shown in FIGS. 2 and 3, above, the RBC search process in the server takes as input the bit stream from the PUF image. This is used as, or as the basis for, an encryption key. In the case of AES, the user ID, or some other plaintext known a priori to both server and client, is encrypted using the bit stream, K, which is then permuted in the search procedure. It will be appreciated that as the search for the server's key proceeds, the server may be required to execute a significant number of AES encryption operations.

The search can use the AES or other asymmetric cryptographic protocols, such as Elliptic Curve Cryptography (ECC) to authenticate public keys from client devices. In this case, using the bit stream from the PUF image, the server's search uses ECC to generate public/private keys to determine whether the public key received from the client should be authenticated.

In addition to the aforementioned potential drawback of requiring the server to execute many encryption steps, the abovementioned methods have additional areas in which improvements could be made. For example, consider that the logic of the search process is directly related to the cryptographic algorithm. For instance, if a client wishes to use a different cryptographic protocol, such as a post-quantum cryptography (PQC) algorithm (e.g., SABER or CRYSTALS-Dilithium), the key generation procedure in the RBC search needs to be significantly revised. Thus, the standard RBC protocol requires knowledge of, and ideally, optimization for, the encryption algorithm by the server. Because the algorithm-aware RBC search is processor intensive to carry out, significant work is needed to optimize each of these cryptographic algorithms and their primitives for a range of computer architectures.

To address this and other shortcomings, a salted hashing algorithm is disclosed. The goal of the algorithm is to make the search process agnostic to the type of cryptographic algorithm employed. This has several benefits over the standard RBC algorithms, for example:

Any cryptographic algorithm that generates public keys can be employed in the system. Of particular interest is supporting post-quantum cryptography algorithms.

Instead of optimizing the key generation procedure of several cryptographic algorithms to improve key search throughput on the server, optimization efforts can be focused on a single search procedure.

A single RBC search system allows the technology to be developed on a wider range of computer hardware platforms, including emerging parallel architectures. This allows one to assess the performance and cost benefits of using one parallel architecture over another.

Figure 5:
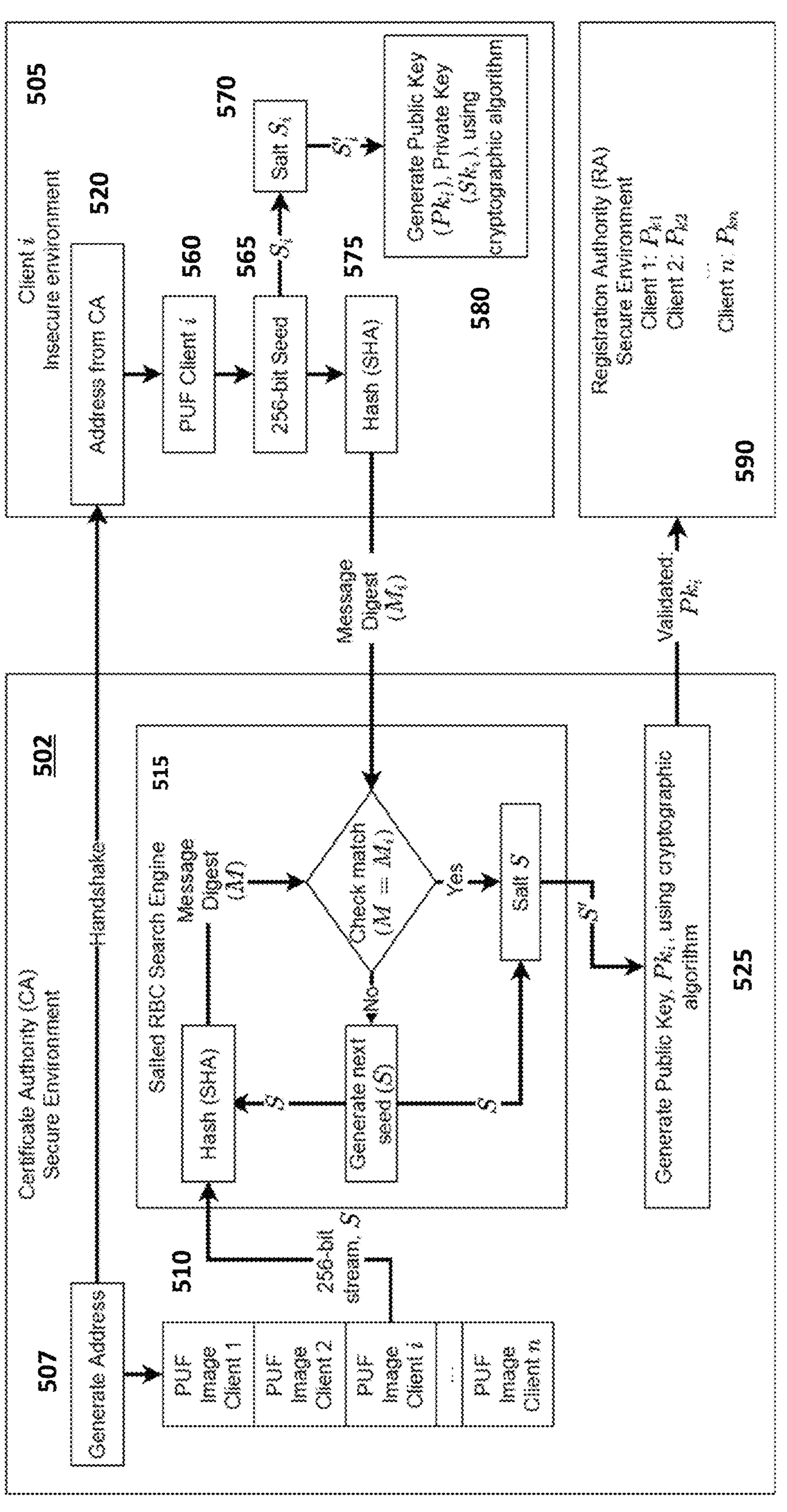
FIG. 5 is a system diagram including process flow steps illustrating a salted hashing protocol for more efficiently determining a server APG response.

FIG. 5 depicts a system diagram with process flow steps illustrating an exemplary salted hashing protocol. Here, the system and method is agnostic as to the cryptographic method used to computer the key pay after a match between the client and server PUF responses (measured and stored) has been determined. The method may be used in arrangements with multiple clients i, where i=1 . . . n, but for clarity only a single client is shown.

In the arrangement of FIG. 5, there is illustrated a hashing and search procedure. The search begins in a manner similar to the systems described above. A Certificate Authority (CA) (502) operates in a secure environment. The CA 502 is in possession of copies or images of the responses of PUFs, which are in client devices 505. The CA as described below, may be a server device.

An exemplary process starts when the server 502 generates one or more PUF addresses. This may be done with or in connection with a random number generated at the server. The address(es) indicates the addresses of addressable PUF devices in an AGP 560 in the possession of a client 505. The addresses are passed to the client as a handshake message. The handshake message may include additional information such as measurement conditions under which the addresses of the specified PUF devices are to be measured.

Client device 505, having received the handshake message, determines the addresses 520 of its PUF 560 to be measured. The client measures or reads a seed, for example, a 256-bit seed, from its PUF 560. This may involve reading or measuring the responses of individual PUF devices at an array of PUF addresses specified in the handshake, measuring a number of PUF devices at specified addresses multiple times, or under multiple measurement conditions etc. Bit expansion strategies such chunking and hashing, or chunking and XORing portions of the measured response stream may also be employed.

The client computes a cryptographic hash 575 of the seed S_i 565 extracted from the measured PUF responses (which, again, may be just the bitstream of the responses themselves). This may be done using SHA (e.g., SHA-256), or any variant of SHA. If SHA-256 is selected, the input response bitstream need not be 256 bits. The hash 575 is sent as a message digest M_i 585 to server 502.

At the server, the server generates its own seed S from the previously measured and stored PUF responses in the PUF image 510. Specifically, server 502 retrieves previously measured responses of PUF devices having the addresses 507 (an optionally, measurement conditions) specified in the handshake message. S is passed to an RBC search engine running on the server processor 515. Seed S is hashed using the same hashing method used by client 505, for example, SHA, and the resulting message digest M is compared to the received message digest M_1. If they match, the server may compute a public key Pk_i using a salted version of S, as described below. If the message digests do not match, the server permutes the seed S in the same manner described above in connection with previously described RBC methods (e.g., by sequential bit flipping), recomputes the hash, and compares the resulting hashed seed to the received message digest (i.e., the hashed seed from the client). Once the server's RBC search engine finds a seed that produces a matching hash (M=M_i), the process stops.

When the server has found a seed that produces the matching message digest, the seed S is salted. Salting is an operation that may be applied to n-bit seeds (in this case, 256-bit seeds) on the server(S) and client (S_i) to ensure there is no correspondence between the public message digest and authenticated public keys. Salting may include bit shifting the seed by some predetermined number of places, (e.g., 1-bit left, or 2-bits right) as described below in connection with the discussion regarding generating invertible seeds. In such cases, the amount and sign of the shift may be known a prior by both devices, or it may be computed by both devices based on shared information. For example, the amount and sign of the shift may be computed at each device on the basis of a username associated with the client that is known by the server. Time-synchronized random number generators at each device may also be used. The only requirement is that the same salt be applied by both the client and server. In alternative embodiments, salting may also include shifting the seed by some predetermined number of places and adding a predetermined sequence of salt bits (the number equal to the amount of the sift) to the front of the bitstream. The salting sequence and the amount and direction of the shift, in this case, would be known a priori by both the client and the server, or may be derived from some shared source, like a username or time synchronized RNGs.

As a general matter, any perturbation of the seeds that is performed to randomize the seeds in the same manner, at both client and server, and in such away that the resulting salted seeds may be input into a cryptographic key generation algorithm are acceptable and within the scope of the invention. The key is that the method of perturbing the seeds be shared between the devices, such that information about the perturbation need not be shared between them. In addition, or as alternatives to the salting methods described above, the can be salted by encrypting them according to the same algorithm, sequentially XORing adjacent bits, providing the seeds to an extended output function (XOF), etc.

After salting, or otherwise changing both seeds at the client and server, an encryption key Pk_i, which may be a public key in an asymmetric system as shown, is computed using a cryptographic algorithm 525 using the salted seed S' as the seed. The resulting key Pk_i may be sent to and stored at a Registration authority (RA) (590), which is a secure repository of known authentic keys associated with various clients. In some embodiments, server 502 may act as the registration authority.

At the client, the client's seed S_i is also salted in the same manner as at the server, and the resulting salted seed 570 may be used to compute a corresponding cryptographic key or key set according to a cryptographic keying algorithm 580. In asymmetrical systems, as shown, the client's salted seed may be used to compute both a public and private keys (Pk_i and Sk_i). As in conventional asymmetric encryption systems, the client's private key may be used to decrypt messages that have been encrypted with the corresponding public key (e.g., the public key that is available through the registration authority). The client may also sign messages with the private key that are verifiable by holders of the corresponding public key.

It is emphasized again that both the client and server must share the same salt (e.g., both devices must shift their respective seeds by the same amount). This permits each device to generate the same public keys. It also ensures that there is not a correspondence between the public key and the message digest, which is assumed to be transmitted over an unsecure channel.

The cryptographic algorithm used depends on the use case. The algorithm could be AES, ECC, or a PQC algorithm, such as one of the National Institute of Standards and Technology (NIST) round 3 PQC KEM and DSA candidates: Classic McEliece, CRYSTALS-Kyber, NTRU, SABER, CRYSTALS-Dilitium, FALCON, and Rainbow.

Comparing the methods of FIGS. 2 and 5, it will be appreciated that in the salted hashing protocol, the server only needs to generate a public key once using a cryptographic algorithm. In contrast, some previously described RBC algorithms incorporate a key generation procedure for each permutation of the 256-bit seed (i.e., each search step). Given that key generation in most cryptographic algorithms (except AES) is more expensive than hashing using SHA, the salted approach is less computationally expensive than the original RBC protocol.

The improved method described thus far in this disclosure to generate cryptographic key pairs from a salted seed benefits from an indexing scheme with some number of iterations to handle the cases when the mathematical properties of the seed cannot support the successful generation of the key pairs due to mathematical conditions including but not limited to a lack of a natural inverse. Like the salting technique, the indexing scheme is preferably based on pre-arranged computations between the two devices such as, left shifting of the data stream (i.e., the measured response data stream and the retrieved response data stream that has been permuted by the server) and forming a new seed that can successfully generate the public-private key pair. An example of the indexing scheme is below:

| 1 | 1 | 0 | 1 | 0 | 0 | 0 | 1 | . . . . . . . , | 1 | 0 | 0 | 0 |
|---|---|---|---|---|---|---|---|---|---|---|---|---|

Left shift by 1:

| 1 | 0 | 1 | 0 | 0 | 0 | 1 | , . . . . . . . | 1 | 0 | 0 | 0 | 1 |
|---|---|---|---|---|---|---|---|---|---|---|---|---|

Left shift by 2:

| 0 | 1 | 0 | 0 | 0 | 1 | . . . . . . . . | 1 | 0 | 0 | 0 | 1 | 1 |
|---|---|---|---|---|---|---|---|---|---|---|---|---|

In certain embodiments, if the initial seed does not have an inverse, the client device will try shifting toward the left by 1, try to find an inverse and pursue more shifting to find a "good" seed. An index is combined with the message digest (the hash of the seed) sent to the server, in a way that is fully recognizable by the server. For example, if the client device needs a left shift by 4, the index "4" is transmitted to the server. The indexing information may contain both quantity of the shift and the sign, or just the quantity in cases where both devices know beforehand to shift in the same direction. The server uses the index to modify the seed that has been retrieved by the search engine and gets a modified stream that will be able to generate the public-private key pair. Importantly, the use of an index is not a source of important leaked information. The opponent does not gain any useful information by having access to the index.

Other methods may be employed to ensure that both client and server shift their respective seeds in the same manner until a shifted seed capable of key generations is reached. For example, the devices could share pre-stored set of shifts that are tried in sequence, and in the event that none results in a good seed, the server could send another handshake, and the process of FIG. 6 could repeat. Alternatively, each device could shift in accordance with values generated by time synchronized RNGs.

The segmentation methods described above and previously disclosed can be optionally applied to the proposed salted hashing protocol. The only difference between the methods is that instead of sending g subkeys from the client to the server, the seed on the client, $S_i$, is split into g 256-bit subseeds. These g subseeds are then used to create g message digests to be sent to the server. The same one-time padding scheme described previously remains the same.

To expand on this disclosure, under a segmentation method, the client receives a handshake message specifying PUF addresses. A PUF response bitstream is obtained from the PUF/AGP by measuring devices specified by the addresses. The response stream, which is the seed S_i, is then segmented into g subseeds. The subseeds may be bit expanded with the addition of random/noise bits to provide the correct input to whatever hashing algorithm is being used. Each subseed is hashed and sent to the server as its own message digest. The client salts S_i (without segmentation or bit expansion) and uses the resulting salted seed for a cryptographic key generation process, and generates one or more keys (e.g., a public/private key pair) from S_i.

The same process is repeated on the server, which retrieves previously measured responses from the image, resulting in a bitstream (seed) S. This is segmented into the same number of segments g, and the segments are bit expanded as required. The subseeds are hashed, obviously using the same hashing algorithm as the client. The server then runs the RBC search algorithm, permuting and hashing each subseed until it matches with the corresponding hashed subseed received from the client. When this process is completed for all subseeds, they server has determined permuted seed segments that, when concatenated, equal S_1. The server generates S_1 (which involves stripping out the expanded bits, if any), salts S_1 in the same manner as the client and generates its own key or keys corresponding to the client key or keys. Bit shifting may be incorporated into the process if necessary for key generation.

As is set forth above, one advantage of the methods described herein is that they reduce the processing burden on the server, which only needs to run the cryptographic keying process one time, once the client seed has been uncovered. Another advantage is that the disclosed methods are agnostic as to the encryption and key generation algorithms being used, which means they may used with any encryption and key generation algorithm. Moreover, the disclosed methods are compatible with any processor architecture and specific architectures that have been optimized for specific encryption and key generation methods. Examples of how to use the methods described herein to create key pairs for several classes of algorithms, including post-quantum algorithms, using the PUF-generated seeds that are salted on the server and client, will now be described.

Figure 6:
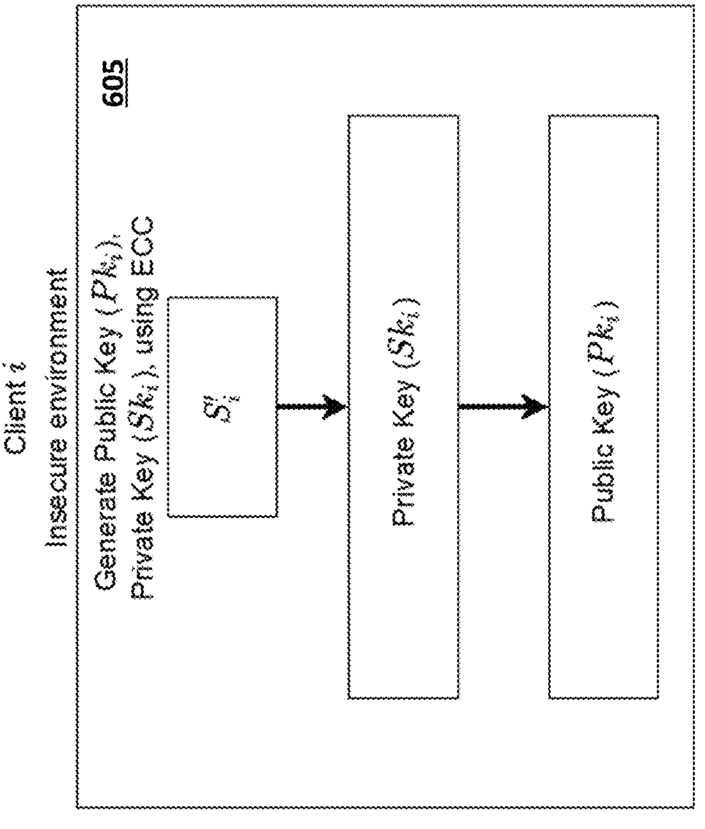
FIG. 6 depicts the use of a salted hashing protocol for an ECC algorithm and generation of public/private keys on a client and a validated public key on a server.

Elliptic Curve Cryptography. While Elliptic Curve Cryptography (ECC) will be obsolete in the near-future due to quantum computing, the application of ECC to the proposed salted hashing algorithm is described below in reference to FIGS. 5 and 6. As described above, FIG. 5 shows an exemplary hashing protocol. FIG. 6 depicts ECC key generation on a server device 602, acting as a certificate authority, and client device 605. Both devices have the same structures and are capable, with programmable processors, of performing the same basic process steps as the devices depicted in FIG. 5. As in FIG. 5, the server device 602 has an image with previously measured responses from an addressable PUF located at client device 605. The client device as an AGP and an addressable PUF from which responses of individual PUF devices can be measured. In the embodiment of FIG. 6, a client salted seed S'_i is generated by one or more of the methods described above in reference to FIG. 5, and a matching server salted seed S' is generated by one or more of the methods described above in reference to FIG. 5.

According to the arrangement of FIG. 6, the salted seed on the client ($S_i'$) is used as input into ECC to generate the private key $Sk_i$, and the public key, $Pk_i$, is generated from $Sk_i$. Both keys are generated at both devices. Note that in ECC, some input seeds (S' and S_i') will produce private keys that generate erroneous public keys. If this occurs, the client will carry out the indexing procedure described previously where, for example, a bit shift is performed to generate a correct public/private key pair. The index is sent to the server along with the message digest so that the server can successfully conduct the RBC search.

Key Generation for Learning with Error (LWE) Lattice Cryptography. A protocol for LWE is described in reference to the arrangements depicted in FIGS. 5 and 7, where the former describes the salted hashing protocol, and the generation of salted seeds from PUF measurements and retrieved responses, and the latter shows the key generation procedure using the salted seeds on the server and client to create public and private keys with LWE methods. Example PQC algorithms that use LWE include CRYSTALS-Dilithium and CRYSTALS-Kyber. Specifically, in the arrangement of FIG. 7, there is again a server device 702 acting as a certificate authority and a client device 705. As in FIG. 5, the server has a programmable processor and a data base containing one or more PUF images, and the client has a programmable processor and an AGP having a PUF. The salted seeds S' and the matching S'_1 are generated according to one or more of the methods described above in reference to FIG. 5. The key generation protocol is outlined as follows:

Client Protocol:

1. After the message digest has been sent to the server, and the seed has been salted to generate $$S_i',$$

the client generates public/private key pairs described as follows.

2. The seed, $$S_i',$$

is used to generate the vectors $$S_i^1$$

and $$S_i^2$$

3. A random number generator is used to create the seed $a_i$, which is then used to generate matrix $A_i$. Seed $a_i$ is public information.
4. Vector $t_i$ is computed as follows:

$$t_i \leftarrow A_i \cdot s_i^1 + s_i^2.$$

5. The public key, $Pk_i$, is computed as follows: $Pk_i \leftarrow \{a_i; t_i\}$, and is public information.
6. The private key, $Sk_i$, is computed as follows:

$$Sk_i \leftarrow \{s_i^1; s_i^2\},$$

and is secret.

Server protocol: Since both the server seed (S') and client seed $$(S_i')$$

are equal, the protocol for the server is identical to the client's protocol, as described above. The only exception is that the server does not generate the client's secret key, $Sk_i$. Seed $a_i$ may be shared between server and client, or alternatively, may be generated in parallel by both devices, for example, with time synchronized RNGs.

Key Generation for Nth Degree-Truncated Polynomial Ring Units (NTRU) Lattice Cryptography. Two algorithms are considered by the third phase of the NIST PQC standardization that use Nth Degree-Truncated Polynomial Ring Units (NTRU): NTRU and FALCON. NTRU defines the following: a prime number N, a large number q, and a small number p. Two polynomials, $g_i$ and $f_i$, are truncated by the numbers df and dg, respectively. Let $Fq_i$ be the inverse of polynomial $f_i$ modulo q, and $Fp_i$ be the inverse of polynomial $f_i$ modulo p.

FIG. 8 depicts an arrangement for generating PUF-based encryption keys using NTRU lattice cryptography. As with the embodiments above, the salted seeds S' and S'_i are generated by a server/CA device 802 and a client 805 in accordance with the methods described in reference to FIG. 5. A single PUF-generated bit stream to create the polynomials $g_i$ and $f_i$, except that the method is adapted to the present salted approach by using the salted seeds $S_i$ and $$S_i'.$$

Furthermore, error correction is applied to the seed such that the polynomials $g_i$ and $f_i$ can be generated correctly, as the inverse polynomials may be unsuitable based on prior conditions. In this case, the shifting and indexing procedure described above is applied to the seeds. FIG. 8 illustrates the client and server key generation protocols.

Client Protocol:

After the message digest has been sent to the server, and the seed has been salted to generate $$S_i',$$

the client generates public/private key pairs described as follows.

1. An error correction scheme is applied to the salted seed, $$S_i'.$$

2. The error corrected seed $$S_i'$$

is used as input to SHA-3 and SHAKE to generate the truncated polynomials $g_i$ and $f_i$.
3. Inverse polynomials $Fp_i$ and $Fq_i$ are computed. A verification procedure is carried out to ensure preconditions are met.
4. If the preconditions are not met, we perform the indexing procedure on seed $$S_i'.$$

5. Compute polynomial: $h_i \leftarrow p \cdot Fq_i \cdot g_i$.
6. Compute private key: $Sk_i \leftarrow \{f_i; Fp_i\}$.
7. Compute public key: $Sk_i \leftarrow h_i$.

When the prior conditions are unmet in step 4 above, the indexing procedure is performed as described previously that finds a seed on the client device that will generate the correct public/private key pair. The index (number of iterations required) of the procedure, such as the number of bit shifts, is sent to the server along with the message digest.

Server protocol: Since both the server seed (S') and client seed $$(S_i')$$

are equal, the protocol for the server is identical to the client's protocol, as described above. The only exception is that the server does not generate the client's secret key, $Sk_i$.

Key Generation for Code-Based Cryptography. Code-based cryptography, such as Classic McEliece, utilizes binary Goppa codes with computations in finite Galois fields $GF(2^m)$. Parameters include an irreducible polynomial of degree t, a field exponent m, and code of length n, where the code can correct t errors. The information-bearing section of the code word has size $k=n-m \cdot t$ and has a generator matrix G of size $k \cdot n$.

Figure 9:
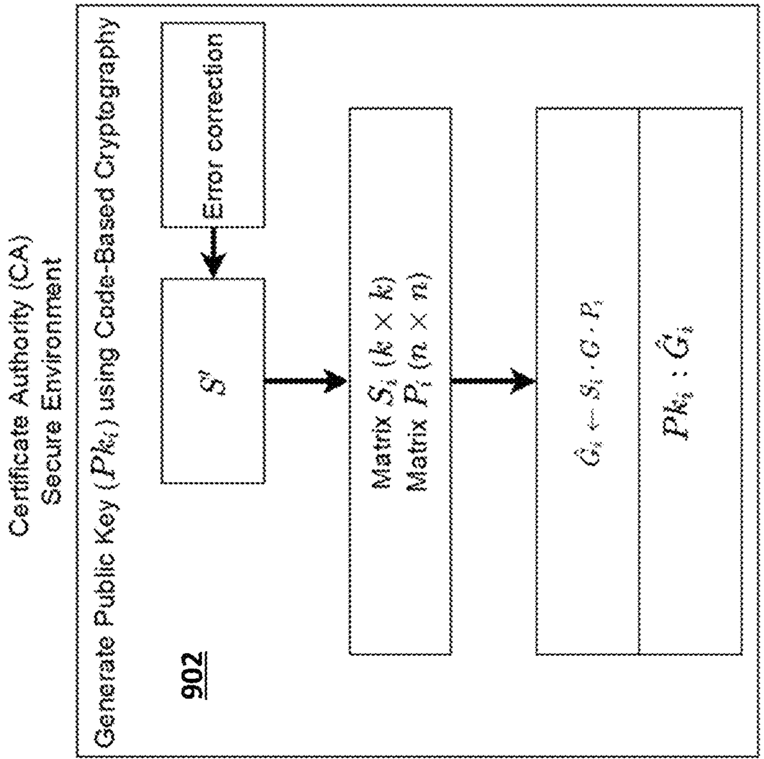
FIG. 9 is a system diagram including process flow steps illustrating the use of a salted hashing protocol for code based cryptography for generation of public/private keys on a client and a validated public key on a server.

The salted hash method described above is usable with code-based cryptography. An arrangement showing process steps performed by a server and/or certificate authority 902 and a client device in possession of a PUF 905 is shown in FIG. 9. As in the embodiments above, the client and server devices generated salted hashes of the responses (measured and retrieved), S' and S'_i according to one or more of the methods described above in reference to FIG. 5. The encryption protocol is set forth with respect to FIG. 9:

Client Protocol:

1. The client uses the error corrected seed, $$S_i',$$

to generate matrices $S_i$ and $P_i$.
2. The inverse of the matrices is computed and are denoted as $$S_i^{-1}$$

and $$P_i^{-1}.$$

A verification procedure is carried out to ensure preconditions are met.
3. If the preconditions are not met, restart the authentication process by requesting a new handshake with the server, or by modifying the matrices with pre-arranged computations.
4. $\hat{G}_i \leftarrow S_i \cdot G \cdot P_i$ is computed.
5. Compute private key:

$$Sk_i \leftarrow \{G; S_i^{-1}; P_i^{-1}\}.$$

6. Compute public key: $Pk_i \leftarrow \hat{G}_i$.

Similar to NTRU, in step 2, the computation of the inverse matrices $$S_i^{-1}$$

and $$P_i^{-1}$$

may fail. Consequently, the process will need to be restarted with another handshake between the server and client, or by modifying the matrices with pre-arranged computations.

Server protocol: Since both the server seed (S') and client seed $$(S_i')$$

are equal, the protocol for the server is identical to the client's protocol, as described above. The only exception is that the server does not generate the client's secret key, $Sk_i$.

It should be understood that, unless explicitly stated or otherwise required, the features disclosed in embodiments explicitly described herein and elsewhere in this disclosure may be used in any suitable combinations. Thus, as a non-limiting example, any embodiment disclosed herein may use the public-key matching techniques disclosed herein or omit said techniques, as dictated by the needs of a particular application.

The invention claimed is:

1. A method of generating one or more cryptographic keys at a client device having a physical-unclonable-function ("PUF") array of addressable PUF devices, comprising:

receiving a handshake message from a server including a set of instructions including PUF challenges identifying a range of devices in the PUF array, and in response to the handshake message;

measuring a set of physical characteristics of the PUF devices identified by the instructions and generating a response bitstream from responses resulting from measurements of the set of physical characteristics;

hashing the response bitstream and transmitting the resulting hash to the server;

salting the response bitstream in accordance with a predetermined salting algorithm to create a salted response bitstream, and determining whether the salted response bitstream has mathematical properties supporting successful generation of a key pair using a predetermined cryptographic key generation algorithm such that the algorithm produces a usable key, and if so, generating a cryptographic key with the salted response bitstream in accordance with the cryptographic key generation algorithm and using the cryptographic key in communication with the server.

2. The method of claim 1, wherein the predetermined salting algorithm includes bit shifting the response bitstream by a predetermined number of bits in a predetermined direction.

3. The method of claim 1, wherein the predetermined salting algorithm includes one of applying the response bitstream to an extended output function, a sequential XOR process, or encryption.

4. The method of claim 1, wherein the cryptographic key generation algorithm is one of Advanced Encryption Standard ("AES"), Elliptic Curve Cryptography ("ECC"), Learning With Errors ("LWE"), Number Theory Research Unit ("NTRU") or code-based cryptography.

5. The method of claim 1, wherein if the salted response bitstream does not have mathematical properties supporting successful generation of a key pair using the predetermined key generation algorithm such that the predetermined key generation algorithm is unable to produce a usable key, bit shifting the salted response bitstream by a predetermined number of bits in a predetermined direction, generating a cryptographic key with the resulting shifted salted response bitstream, and sending a message digest to the server indicating the number of bits and the direction of the shift.

6. The method of claim 1, wherein determining whether the salted response bitstream has mathematical properties supporting successful generation of a key pair using a predetermined cryptographic key generation algorithm such that the algorithm produces a usable key comprises determining whether the salted response bitstream has a natural inverse.

7. A method of generating one or more cryptographic keys at a server device, the server device having a database of previously measured physical characteristics of physical-unclonable-function ("PUF") devices of an addressable array of PUF devices on a client device, comprising:

at the server device, generating a set of instructions including PUF challenges identifying a range of PUF devices in the addressable array of PUF devices;

transmitting the set of instructions to the client device;

retrieving, from the database, previously measured physical characteristics of PUF devices identified by the set of instructions, and generating therefrom a first seed;

computing a first cryptographic hash from the first seed;

receiving, from the client device, a second cryptographic hash of a response bitstream generated by, in response to the transmitted set of instructions, measuring physical characteristics of PUF devices of the addressable array of PUF devices identified in the instructions;

comparing the first and second cryptographic hash;

if the first and second cryptographic hashes do not match, iteratively modifying the first seed to create a modified first seed, hashing the modified first seed to create a hashed modified first seed, and comparing the hashed modified first seed to the second cryptographic hash until the hashed modified first seed matches the second cryptographic hash, or a predetermined timeout threshold is crossed, and when the first cryptographic hash or the hashed modified first seed match the second cryptographic hashes, salting the first seed to create a salted first seed, in accordance with a predetermined salting algorithm and generating one or more cryptographic keys from the salted first seed using a predetermined cryptographic key generation algorithm.

8. The method of claim 7, wherein the predetermined salting algorithm includes bit shifting the seed by a predetermined number of bits in a predetermined direction.

9. The method of claim 7, wherein the predetermined salting algorithm includes one of applying the seed to an extended output function, a sequential XOR process, or encryption.

10. The method of claim 7, wherein the cryptographic key generation algorithm is one of Advanced Encryption Standard ("AES"), Elliptic Curve Cryptography ("ECC"), Learning With Errors ("LWE"), Number Theory Research Unit ("NTRU") or code-based cryptography.

11. The method of claim 7, wherein generating one or more cryptographic keys from the salted first seed using a predetermined cryptographic key generation algorithm comprises determining whether the salted first seed has mathematical properties supporting successful generation of a key pair using the predetermined cryptographic key generation algorithm, and if not, bit shifting the first seed by a predetermined number of bits in a predetermined direction, and generating one or more cryptographic keys with a resulting shifted salted seed.

12. The method of claim 7, wherein iteratively modifying the first seed to create a modified first seed comprises sequentially flipping bits in the first seed on each iteration.

13. A method of cryptographic communication between a client device having a physical-unclonable-function ("PUF") array of addressable PUF devices and a server device having a database of previously measured physical characteristics of PUF devices of the addressable array of PUF devices on the client device, comprising:

at the server device, generating a set first of instructions including PUF challenges identifying a first range of addressable PUF devices in the array of addressable PUF devices;

transmitting the first set of instructions to the client device;

retrieving, from the database, previously measured physical characteristics of the first range of PUF devices identified by the first set of instructions, and generating therefrom a first seed;

computing a first cryptographic hash from the first seed;

at the client device, receiving the first set of instructions including PUF challenges identifying the first range of devices in the PUF array;

measuring a set of physical characteristics of the first range of PUF devices identified by the first instructions and generating a second seed from responses resulting from measurements of the set of physical characteristics;

computing a cryptographic hash of the second seed, and transmitting the hash of the second seed to the server device;

modifying the second seed according to a predetermined salting algorithm resulting in a salted second seed, generating one or more cryptographic keys with the salted second seed;

at the server device, hashing the first seed resulting in a cryptographic hash of the first seed;

comparing the cryptographic hash of the first seed to the cryptographic hash of the second seed, and if the cryptographic hash of the first seed matches the cryptographic hash of the second seed, modifying the first seed according to the predetermined salting algorithm resulting in a salted first seed, and generating one or more cryptographic keys with the first salted seed, wherein, at the server, if the cryptographic hash of the first seed and the cryptographic hash of the second seed do not match, iteratively modifying the first seed resulting in a modified first seed, hashing the modified first seed, and comparing a hash of the modified first seed to the cryptographic hash of the second seed until a hash of the modified first seed matches the cryptographic hash of the second seed, or a predetermined timeout threshold is crossed.

14. The method of claim 13, wherein if the predetermined timeout threshold is crossed, at the server device, sending a second set of instructions including PUF challenges identifying a second range of addressable PUF devices in the array of addressable PUF device, and, at the client device, measuring a set of physical characteristics of the second range of PUF devices identified in the second set of instructions.

15. The method of claim 13, wherein the predetermined salting algorithm includes bit shifting the seed by a predetermined number of bits in a predetermined direction.

16. The method of claim 13, wherein the predetermined salting algorithm includes one of applying the seed to an extended output function, a sequential XOR process, or encryption.

17. The method of claim 13, wherein the cryptographic key generation algorithm is one of Advanced Encryption Standard ("AES"), Elliptic Curve Cryptography ("ECC"), Learning With Errors ("LWE"), Number Theory Research Unit ("NTRU") or code-based cryptography.

* * * * *